Sept. 28, 1926.
R. B. HAYDEN
1,601,249
TWO-WHEELED VEHICLE
Filed Sept. 13, 1924     2 Sheets-Sheet 1
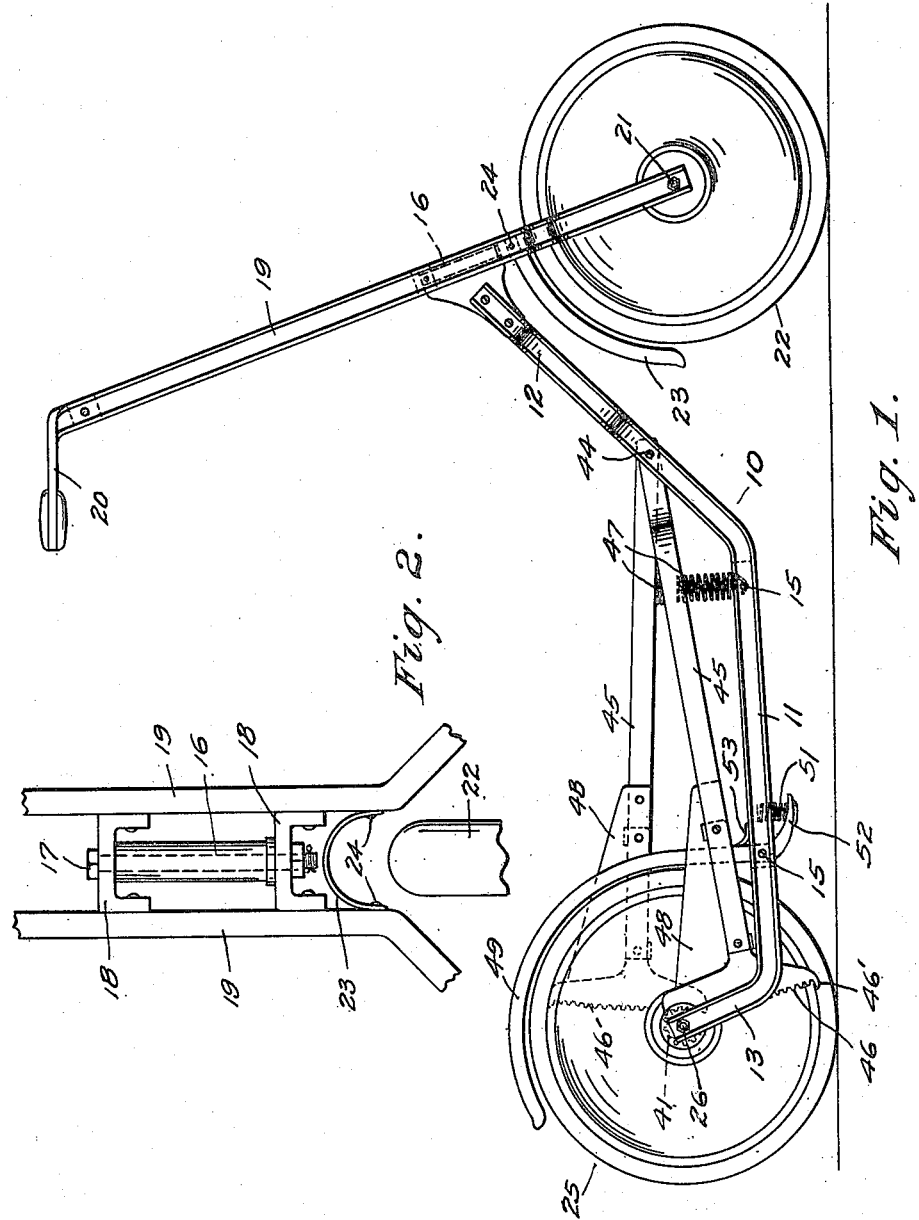
INVENTOR
Robert B. Hayden
BY
Pierre Barnes
ATTORNEY

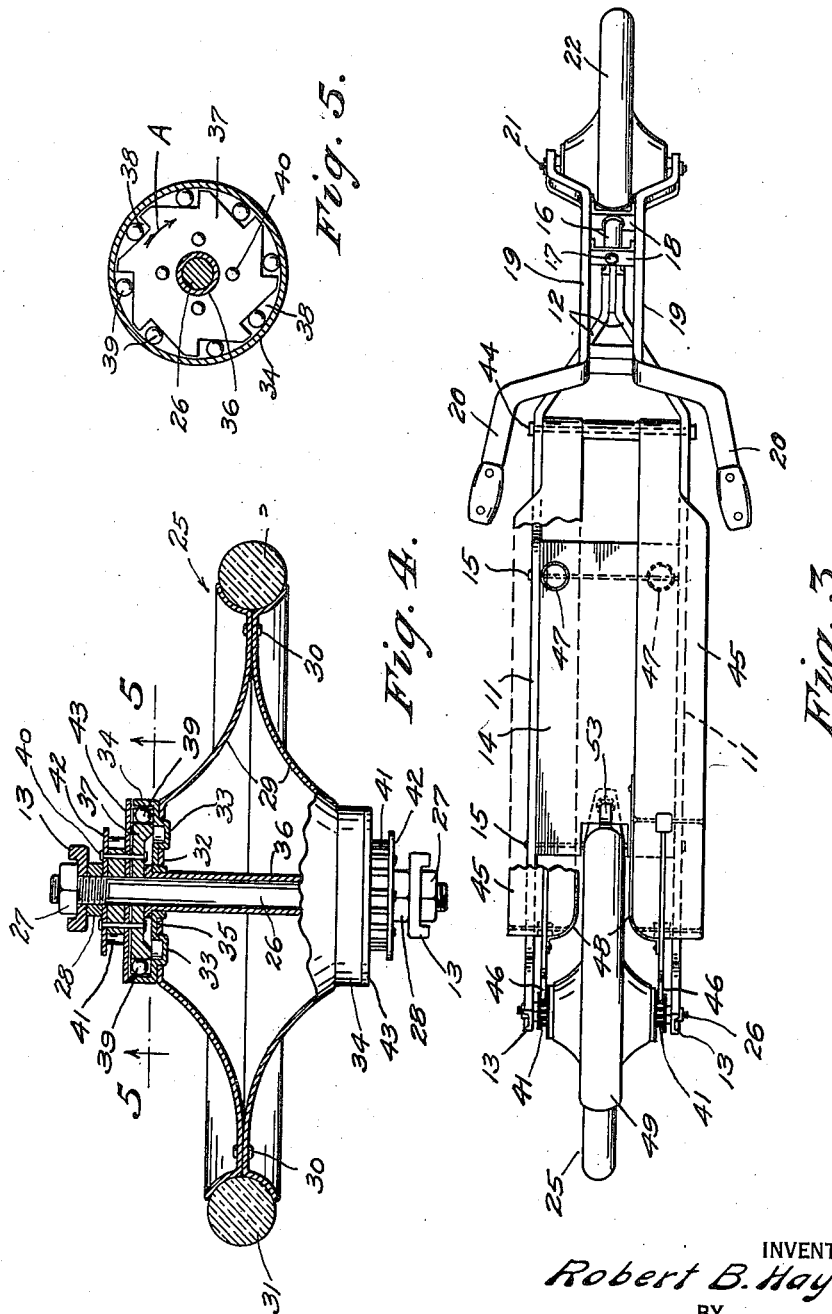

Patented Sept. 28, 1926.

1,601,249

UNITED STATES PATENT OFFICE.

ROBERT B. HAYDEN, OF SEATTLE, WASHINGTON, ASSIGNOR TO PED-O-KAR MANUFACTURING COMPANY, OF CONNELL, WASHINGTON, A CORPORATION OF WASHINGTON.

TWO-WHEELED VEHICLE.

Application filed September 13, 1924. Serial No. 737,492.

This invention relates to wheeled vehicles of the coaster type.

The object of the invention is to produce a device of this character having treadle actuated propelling means, the whole being so constructed and arranged as to afford considerable pleasure and exercise to children of various sizes and ages.

More specific objects and advantages of the invention will appear in the following description.

The invention consists in the novel construction, adaptation and combination of parts hereinafter described and claimed.

In the accompanying drawings,—

Figure 1 is a side elevation of a vehicle embodying my invention. Fig. 2 is a fragmentary front elevation thereof. Fig. 3 is a plan view of Fig. 1 with a portion of one of the treadles broken away. Fig. 4 is a detail view partly in plan and partly in horizontal section of the rear wheel and axle assembly. Fig. 5 is a sectional view taken substantially on line 5—5 of Fig. 4.

In the drawings, the reference numerals 10 represent longitudinally disposed side bars, each having a substantially horizontal central portion 11 with upwardly inclined forward and rear portions 12 and 13.

14 represents a platform consisting, preferably, of a board which is positioned between the central portions 11 of said side bars and is secured to the latter as by means of transversely arranged bolts 15.

The above referred to parts constitute the reach of the vehicle. The forward end of said reach is formed or provided with a tubular extension 16 through which passes a swivel pin 17 whose ends engage in spaced bridge elements 18 (Fig. 2) located between the side bars 19 of a frame which constitutes the steering post of the vehicle.

The upper portion of the steering post bars 19 are formed to provide arms 20 adapted to be grasped in the hands of the user for conveniently turning the steering post to direct the vehicle. The lower ends of said post bars are secured to the ends of an axle 21 upon which is rotatably mounted the front ground or steering wheel 22.

23 represents a fender for the front wheel and is secured as by means of rivets 24 to said post.

25 represents a traction wheel mounted for rotation upon an axle 26 which is secured to the respective bar portions 13 of the reach by means of nuts 27 and 28 engaging screw threaded ends of the axle.

The front and back wheels 22 and 25 are each desirably formed of companion conoidal plate or disc members 29 which are united as by means of rivets 30. The said wheels are formed to provide a peripheral groove for a resilient tire 31 preferably of rubber or of a composition containing rubber.

As shown in Fig. 4, the wheel plates 29 are each formed with a plane central portion 32 which is apertured to receive projections such as 33 in the end wall of a cylindrical drum or clutch member 34 to rotatably unite the latter with the associated wheel.

The clutch members 34, one at each side of the wheel, are held in couple with the wheel as by flanging against the respective end walls of the drums the extremities 35 of a sleeve 36 which sleeve also serves as a journal bearing for the associated axle.

Rotatably mounted upon the axle and within each of the clutch members 34 is a ratchet wheel 37 with triangular shaped gullets 38 (Fig. 5) within which rollers or balls 39 function to clutch the drum 34 and the associated wheel 25 to the ratchet wheel when the latter is rotated in the direction of the arrow A.

The traction wheel 25 is, however, permitted to rotate in the arrow direction independently of the ratchet wheel when a ratchet wheel itself is secured against rotative movement. Coupled with each ratchet wheel as by means of rivets 40 is a spur pinion 41 having secured at opposite sides thereof circular plates 42 and 43 of which the plate 43 is of sufficient diameter to serve as a closure for the open end of the adjacent drum.

Connected by a pivot pin 44 to the bar parts 12 is a pair of treadles 45 having rigidly secured to their rear ends sector racks 46 which engage the teeth of the respective pinions 41. 47 represent springs interposed between the platform 14 and the treadles tending to yieldingly retain the latter in their uppermost positions, as regulated by stops such as 46[1] adapted to encounter the respective pinions. Each treadle is provided with a guard 48 to prevent the feet of the operator standing upon the pedal from contacting with the traction wheel.

Included in the invention is a brake, the shoe 49 of which is in the nature of a movable fender for the rear wheel 25. Said shoe is pivotally connected to a platform securing bolt 15 and is normally held in inoperative relation with the wheel by means of a spring 51 acting between said platform and an arm 52 of the shoe. 53 represents a finger projecting from the shoe and engageable with said platform to limit the separation of the shoe with respect to the wheel.

The vehicle is adapted to be driven rapidly over practically level surfaces and also for use in coasting down a hill or slope.

The user grasping the handles 20 in his hands stands with one foot upon each of the treadles 45 and by pressing down upon each treadle in turn causes motion to be transmitted through the sector gears 46, pinions 41 and clutch devices 37, 39 and 34 to impart rotary motion to the traction wheel 25 to propel the vehicle.

In such operation it is to be understood that the treadles are to be pressed down by the weight of the user applied first through one foot and then through the other alternately and in such a manner as to cause the vehicle to travel unspasmodically.

When the pressure upon a treadle is removed the spring 47 pertaining thereto asserts its power to elevate the treadle into position to be again pressed down. During such upward return stroke of a treadle the sector gear therefor turns the associated pinion and ratchet wheel in a direction wherein the clutch balls 39 are inoperative to engage the clutch element 34, thereby rendering the clutch devices idle during the reverse rotary movements of the pinions. For coasting, the user stands with his weight supported about equally upon both treadles whereupon the ratchet wheels 37 are prevented from turning, but the traction wheel is free to turn for permitting the vehicle to advance, as will be understood from Fig. 5 wherein the wheel-drum 34 is turnable in the direction indicated by arrow A even though the ratchet wheel 37 is held against turning.

With little practice the boy or girl using the device will develop skill and dexterity in balancing, steering, driving and coasting.

While I have illustrated the preferred construction of the invention, I do not wish to limit myself thereto except as limited by the appended claim.

What I claim, is,—

In a wheeled vehicle, the combination of a reach, an axle secured to the rear end of the reach, a traction wheel rotatably mounted upon said axle, a drum secured to each side of said traction wheel, a ratchet wheel within each of said drums, clutch elements provided within the peripheral recesses of said ratchet wheels and engageable with the respective drums when the ratchet wheels are turned in one rotary direction, spur pinions rigid with the respective ratchet wheels and arranged to rotate therewith upon said axle, treadles pivotally connected at one end of each to said reach, a sector gear carried by the other end of each treadle and engageable with the respective pinions for rotating the same, and springs tending to retain said treadles in their uppermost positions.

Signed at Seattle, Washington, this 3rd day of September 1924.

ROBERT B. HAYDEN.